(12) United States Patent
Balamurugan et al.

(10) Patent No.: US 12,456,363 B2
(45) Date of Patent: *Oct. 28, 2025

(54) REDUCING FALSE ALARMS IN SECURITY SYSTEM

(71) Applicant: Honeywell International Inc., Charlotte, NC (US)

(72) Inventors: Ganesan Balamurugan, Bengaluru (IN); Deshpande Surekha, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,851

(22) Filed: Feb. 21, 2024

(65) Prior Publication Data

US 2024/0194053 A1    Jun. 13, 2024

Related U.S. Application Data

(63) Continuation of application No. 17/962,202, filed on Oct. 7, 2022, now Pat. No. 11,941,972, which is a (Continued)

(51) Int. Cl.
*G08B 23/00*        (2006.01)
*G06N 20/00*        (2019.01)
(Continued)

(52) U.S. Cl.
CPC ........... *G08B 29/185* (2013.01); *G06N 20/00* (2019.01); *G08B 21/182* (2013.01); *G08B 25/008* (2013.01)

(58) Field of Classification Search
CPC .. G08B 29/185; G08B 21/182; G08B 25/008; G08B 19/00; G06N 20/00; G06V 20/52; G06V 10/70
(Continued)

(56) References Cited

U.S. PATENT DOCUMENTS 10,573,165 B2    2/2020   Schwarzkopf et al.
10,756,919 B1*   8/2020   Kerzner ............... G05D 1/0282
(Continued)

FOREIGN PATENT DOCUMENTS

WO    2017196688 A1    11/2017

OTHER PUBLICATIONS

Extended European Search Report, European Patent Office, EP Application No. 22179051.2, dated Nov. 22, 2022.

*Primary Examiner* — Tai T Nguyen
(74) *Attorney, Agent, or Firm* — Seager, Tufte & Wickhem, LLP

(57) ABSTRACT

A security system includes a security system controller and a plurality of security sensors that are operably coupled with the security system controller. The security system includes a plurality of configuration settings that define when particular alarms are to be issued by the security system based at least in part on events that are detected by the security sensors. The security system controller receives each of the events detected by the security sensors. The security system controller stores event data that includes an event type, a time value indicating when the event occurred, and an identifier of the security sensor that detected the event. The security system controller analyzes the stored event data to identify and output one or more changes to one or more of the plurality of configuration settings in order to reduce false alarms issued by a security system.

20 Claims, 8 Drawing Sheets

Related U.S. Application Data continuation of application No. 17/362,033, filed on Jun. 29, 2021, now Pat. No. 11,508,234.

(51) Int. Cl.
  *G08B 21/18* (2006.01)
  *G08B 25/00* (2006.01)
  *G08B 29/18* (2006.01)

(58) Field of Classification Search
  USPC .......................................................... 340/500
  See application file for complete search history.

(56) References Cited

U.S. PATENT DOCUMENTS

| | | | |
|---|---|---|---|
| 10,803,720 B2 | 10/2020 | Bucsa et al. | |
| 10,832,563 B2 | 11/2020 | Subramanian et al. | |
| 10,931,692 B1 | 2/2021 | Mota et al. | |
| 11,055,652 B1 | 7/2021 | Kannan et al. | |
| 11,369,321 B2 | 6/2022 | Kwan | |
| 11,483,212 B2 | 10/2022 | Ong et al. | |
| 2007/0008099 A1* | 1/2007 | Kimmel | G08B 25/14 340/506 |
| 2009/0174544 A1 | 7/2009 | Allen et al. | |
| 2013/0169817 A1* | 7/2013 | Jones | G08B 25/14 340/539.2 |
| 2014/0130140 A1* | 5/2014 | Abhyanker | G06Q 30/02 726/4 |
| 2016/0261482 A1 | 9/2016 | Mixer et al. | |
| 2017/0017214 A1* | 1/2017 | O'Keeffe | G05B 15/02 |
| 2017/0132906 A1* | 5/2017 | Peterson | G08B 17/10 |
| 2017/0193395 A1 | 7/2017 | Limonad et al. | |
| 2017/0251013 A1 | 8/2017 | Kirti et al. | |
| 2018/0333083 A1 | 11/2018 | Orellano | |
| 2019/0068627 A1 | 2/2019 | Thampy | |
| 2019/0196424 A1 | 6/2019 | Meganathan et al. | |
| 2019/0260786 A1 | 8/2019 | Dunn | |
| 2019/0355240 A1* | 11/2019 | Razak | G06F 3/0481 |
| 2020/0218801 A1 | 7/2020 | Gross et al. | |
| 2020/0285737 A1 | 9/2020 | Kraus et al. | |
| 2020/0388135 A1 | 12/2020 | Vaknin et al. | |
| 2020/0401853 A1 | 12/2020 | Xiong et al. | |
| 2021/0067590 A1 | 3/2021 | Nakanelua et al. | |
| 2021/0073491 A1 | 3/2021 | Bergman et al. | |
| 2021/0241597 A1 | 8/2021 | Gali et al. | |
| 2021/0295668 A1 | 9/2021 | Blanchard et al. | |
| 2021/0314298 A1 | 10/2021 | Chen et al. | |
| 2021/0377278 A1 | 12/2021 | Yin et al. | |
| 2022/0005332 A1* | 1/2022 | Metzler | G06V 20/35 |
| 2022/0014425 A1 | 1/2022 | Mandliwala et al. | |
| 2022/0058941 A1 | 2/2022 | Lamb | |
| 2022/0415149 A1 | 12/2022 | Albero et al. | |

\* cited by examiner

REDUCING FALSE ALARMS IN SECURITY SYSTEM

This is a continuation of co-pending U.S. patent application Ser. No. 17/962,202, filed Oct. 7, 2022, and entitled "REDUCING FALSE ALARMS IN SECURITY SYSTEM", now U.S. Pat. No. 11,941,972, which is a continuation of U.S. patent application Ser. No. 17/362,033, filed Jun. 29, 2021, and entitled "REDUCING FALSE ALARMS IN SECURITY SYSTEM", now U.S. Pat. No. 11,508,234, both of which are incorporated herein by reference.

TECHNICAL FIELD

The present disclosure relates generally to security systems. More particularly, the present disclosure relates to methods and systems for reducing false alarms in security systems.

BACKGROUND

Security systems often employ a variety of different security sensors to protect a secured area. Some security systems have static configuration settings that are configured when the security system is initially installed. These static configuration settings may be used to help reduce false alarms that are issued by the security system. Such static configuration settings may, for example, defined cross-zone pairs of sensors. A cross-zone pair of sensors must typically both be triggered within a predetermined time of one another before the security system will issue an alarm. In another example, the static configuration settings may define an entry delay, where after entry into a secured area, a user must enter a passcode or the like within the entry delay time otherwise the security system will issue an alarm. In another example, static configuration settings may define an exit delay, where after arming the security system, a user must exit the secured area within the exit delay time otherwise the security system will issue an alarm. These are just examples.

Setting up static configuration settings can require a substantial amount of expertise, and even so, may not be setup optimally. Moreover, and over time, at least some of the static configuration settings may become less ineffective. What would be desirable are methods and systems to automatically update configuration settings of a security system.

SUMMARY

The present disclosure relates to security systems. In an example, a method of reducing false alarms issued by a security system is provided. The illustrative security system includes a security system controller and a plurality of security sensors that are operably coupled with the security system controller. Each of the plurality of security sensors is configured to monitor for and detect one or more predetermined events in a secure space. The illustrative security system also includes a plurality of configuration settings that define when particular alarms are to be issued by the security system based at least in part on the events that are detected by the plurality of security sensors. An illustrative method includes the security system controller receiving each of the events detected by the plurality of security sensors. The security system controller stores event data that includes, for each received event, an event type, a time value indicating when the event occurred, and an identifier of the security sensor that detected the event. The security system controller analyzes the stored event data to identify one or more changes to one or more of the plurality of configuration settings that define when particular alarms are issued by the security system in order to reduce false alarms issued by a security system. The security system controller outputs one or more of the identified changes to the configuration settings. In some cases, the security system controller automatically implements one or more of the identified changes.

In another example, a security system is configured to monitor a secured space. The security system includes a security system controller that is configured to control operation of the security system as well as a plurality of security sensors that are disposed about the secured space. Each of the plurality of security sensors are operably coupled with the security system controller such that each security sensor can communicate detected events to the security system controller. The security system controller is configured to receive each of the events detected by the plurality of security sensor. The security system controller is configured to reference a plurality of configuration settings that define when particular alarms are to be issued by the security system based at least in part on the events that are detected by the plurality of security sensors. The security system controller is configured to analyze the received events to identify one or more changes to one or more of the configuration settings in order to reduce false alarms issued by a security system and to output one or more of the identified changes to the configuration settings. In some cases, the security system controller is configured to analyze received events when the security system is either armed or unarmed, and/or when the security system is armed and unarmed.

In another example, a method of improving performance of a security system having a plurality of security sensors and a plurality of configuration settings assigned to at least some of the plurality of security sensors is provided. The method includes tracking when of each of the plurality of security sensors are activated. Activation data over a period time is stored, the activation data identifying which security sensor was activated and when that security sensor was activated. The stored activation data is analyzed to identify configuration settings that can be optimized and one or more changes to one or more of the configuration settings are outputted in order to improve performance of the security system.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
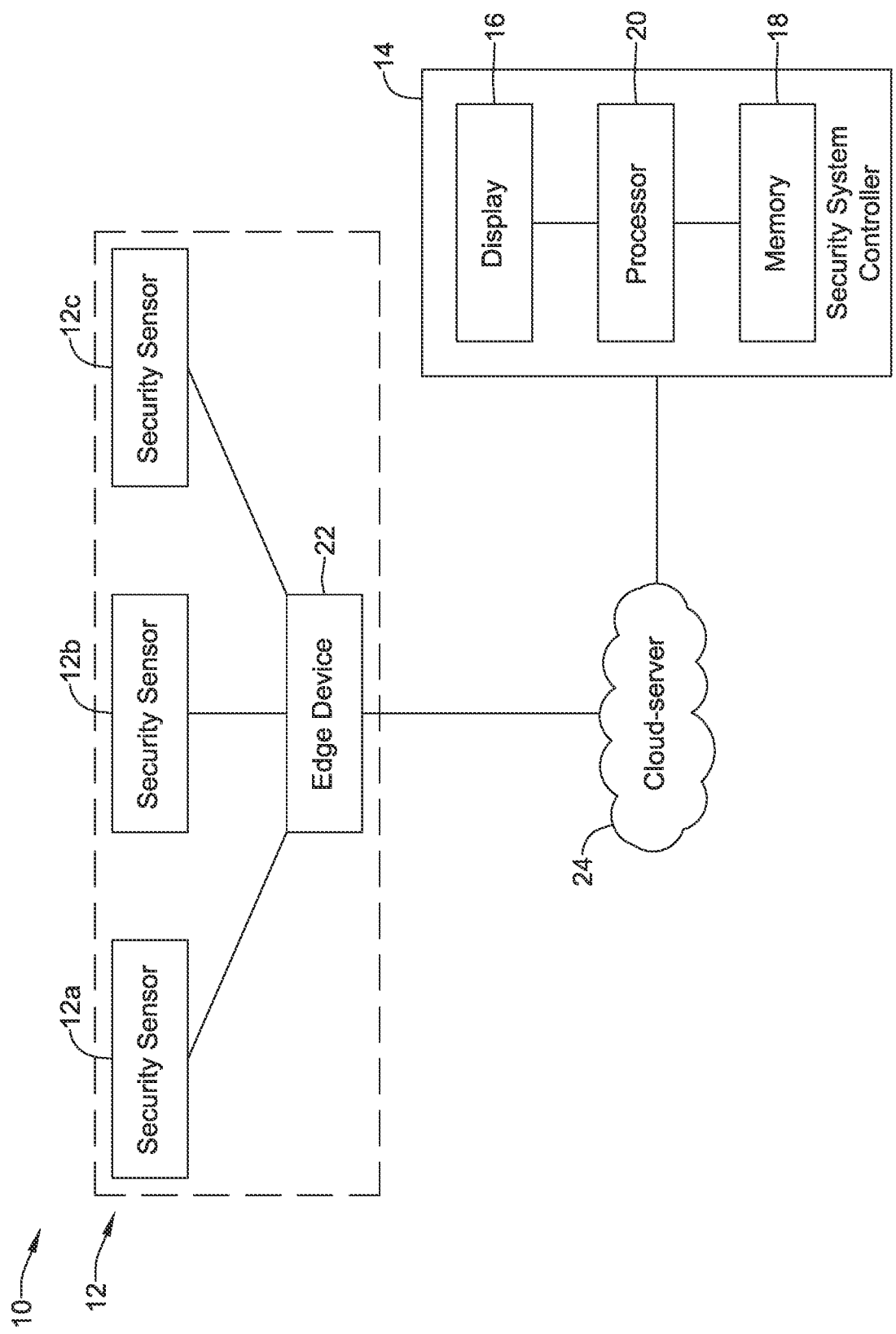
FIG. 1 is a schematic block diagram of an illustrative security system including security sensors and a security system controller.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative security system 10 that is configured to provide surveillance of a secured area, sometimes referred to as a region of interest. The illustrative security system 10 includes a number of security sensors 12 (e.g. one or more) that are disposed within or otherwise cover at least part of the region of interest. In the example shown, the security sensors are individually labeled as 12a, 12b, 12c. While a total of three security sensors 12 are illustrated, it will be appreciated that the security system 10 may include one security sensor, or tens, hundreds or even thousands of security sensors 12 that are disposed about a secured area, for example. The security sensors 12 may include any of a variety of different security sensor types, depending on the application. For example, the security sensors 12 may include motion sensors such as but not limited to PIR sensors. The security sensors 12 may include door contact sensors and/or window contact sensors. The security sensors 12 may include glass break detectors. The security sensors 12 may include one or more video cameras, optionally with video processing capabilities. The security sensors 12 may include access card readers, biometric readers, and/or beam break detectors. The security sensors 12 may include smoke detectors, gas detectors or the like. These are just examples.

The illustrative security system 10 includes a security system controller 14 that is configured to control at least some aspects of operation of the security system 10. In the example shown, the security system controller 14 is operably coupled with each of the security sensors 12 such that the security system controller 14 is able to receive signals from the security sensors 12 indicating a possible intrusion or other potential security event. The security system controller 14 may be configured to interpret signals from the security sensors 12 and ascertain whether there currently is a potential problem. The illustrative security system controller 14 includes a display 16, a memory 18 and a processor 20 that is operably coupled with the display 16 and with the memory 18. While a single processor 20 is shown, it will be appreciated that the security system controller 14 may include two or more distinct processors, for example. In some cases, the security system controller 14 may be distributed. In some cases, the security system controller 14 may be an operator console or the like.

In some cases, the security sensors 12 may communicate directly with the security system controller 14. In some instances, the security system controller 14 may be distributed, including a local security system controller such as the security system controller as well as a remote off-site security system controller. In some cases, as illustrated, the security sensors 12 may communicate directly with an edge device 22. In some instances, the edge device 22 may provide some of the functionality that might otherwise be provided by the security system controller 14 and/or a cloud-based server 24. When provided, the cloud-based server 24 may be configured to send and receive information between the edge device 22 and the security system controller 14, and in some cases provide processing capabilities to support the methods described herein. In some cases, the edge device 22 may be an edge controller. In some cases, the functionality of the security system controller 14 may be distributed among the security system controller 14 and the edge device 22, among the security system controller 14 and the cloud-based server 24, among the edge device 22 and the cloud-based server 24, or among the edge device 22, the cloud-based server 24 and the security system controller 14. In some cases, the edge device 22 and/or the cloud-based server 24 may provide the functionality of a remote off-site controller. In some cases, additional devices (not shown) may be provided that perform part or all of the functionality of the security system controller 14.

Figure 2:
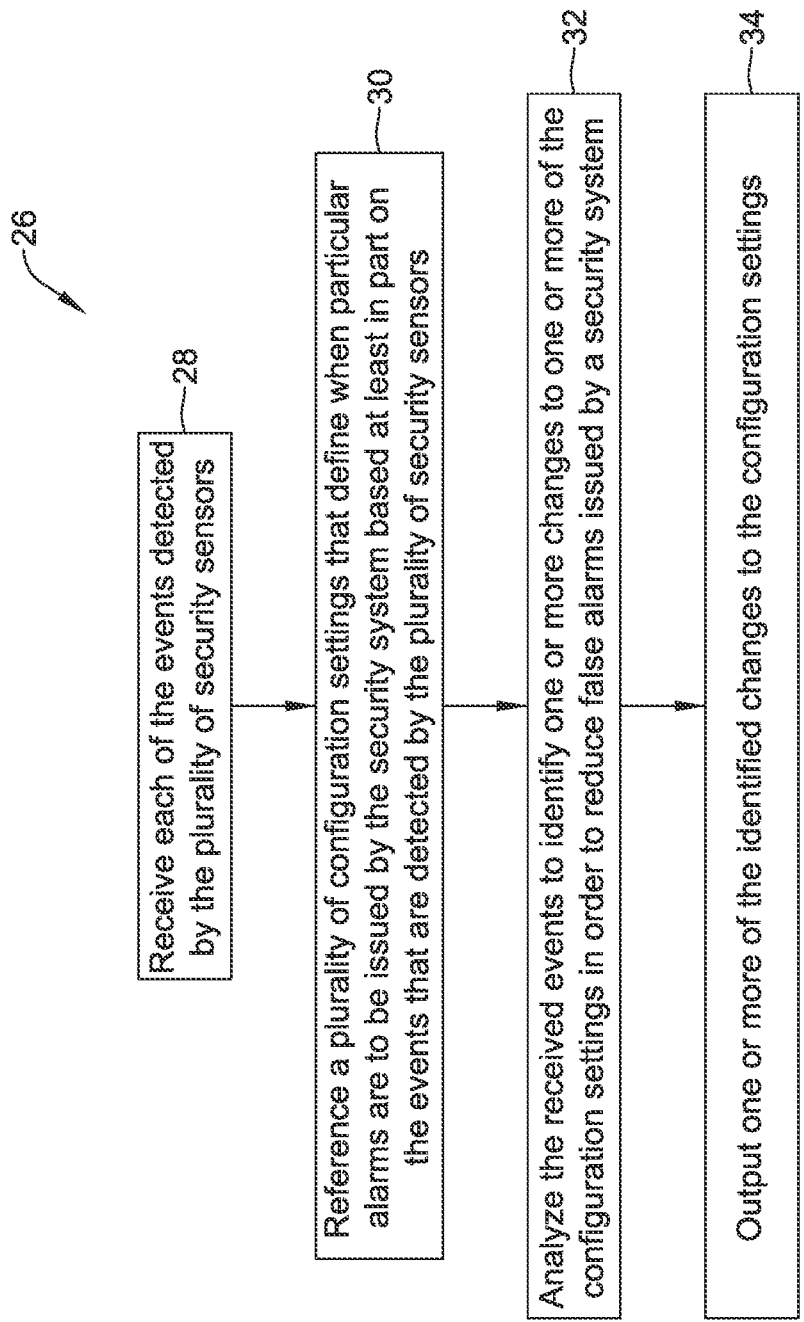
FIG. 2 is a flow diagram showing illustrative configuration features of the security system controller of FIG. 1.

FIG. 2 is a flow diagram showing a series of steps 26 that the security system controller 14 may be configured to carry out. The security system controller 14 may be configured to receive each of the events that are detected by each of the security sensors 12, as indicated at block 28. It will be appreciated that the security system 10 may have an armed state and a disarmed state. While in the armed state, the security system controller 14 actively listens for signals from the security sensors 12. During the disarmed state, the security system controller 14 may still receive signals from the security sensors 12, but does not trigger any alarms in response to those signals. It will be appreciated that in learning how the security system 10 operates over time, and the various interactions between various security sensors, and how a particular event detected by one security sensor 12 is verified or confirmed by one or more other security sensors 12, there is substantially more data that can be analyzed when the security system 10 is disarmed, as this corresponds to when a building or building space corresponding to the secured space has more people present, and thus more activity and patterns of activity for the security sensors 12 to detect.

The security system controller 14 may be configured to reference a plurality of configuration settings that define when particular alarms are to be issued by the security system 10 based at least in part on the events that are detected by the security sensors 12, as indicated at block 30. The configuration settings may include, for example, a cross zone pairing setting that defines how two (or more) security sensors 12 are paired together to form a cross zone set of sensors in which both (or more) security sensors 12 must indicate a detected event within a particular period of time in order for an alarm to be issued. Other configuration settings may include, for example an abort window setting, an entry delay setting, an exit delay setting, and an exit restart setting. These configuration settings are only examples, and may be stored within the memory 18.

The security system controller 14 may be configured to analyze the received events to identify one or more changes to one or more of the configuration settings in order to help reduce false alarms issued by a security system, as indicated at block 32. In some cases, the security system controller 14 may analyze the received events to identify one or more patterns in the stored event data to identify the one or more changes to the configuration settings in order to reduce false alarms issued by a security system. The security system controller 14 may, for example, utilize machine learning in analyzing the received events. The security system controller 14 may be configured to output one or more of the identified changes to the configuration settings, as indicated at block 34.

Figure 3:
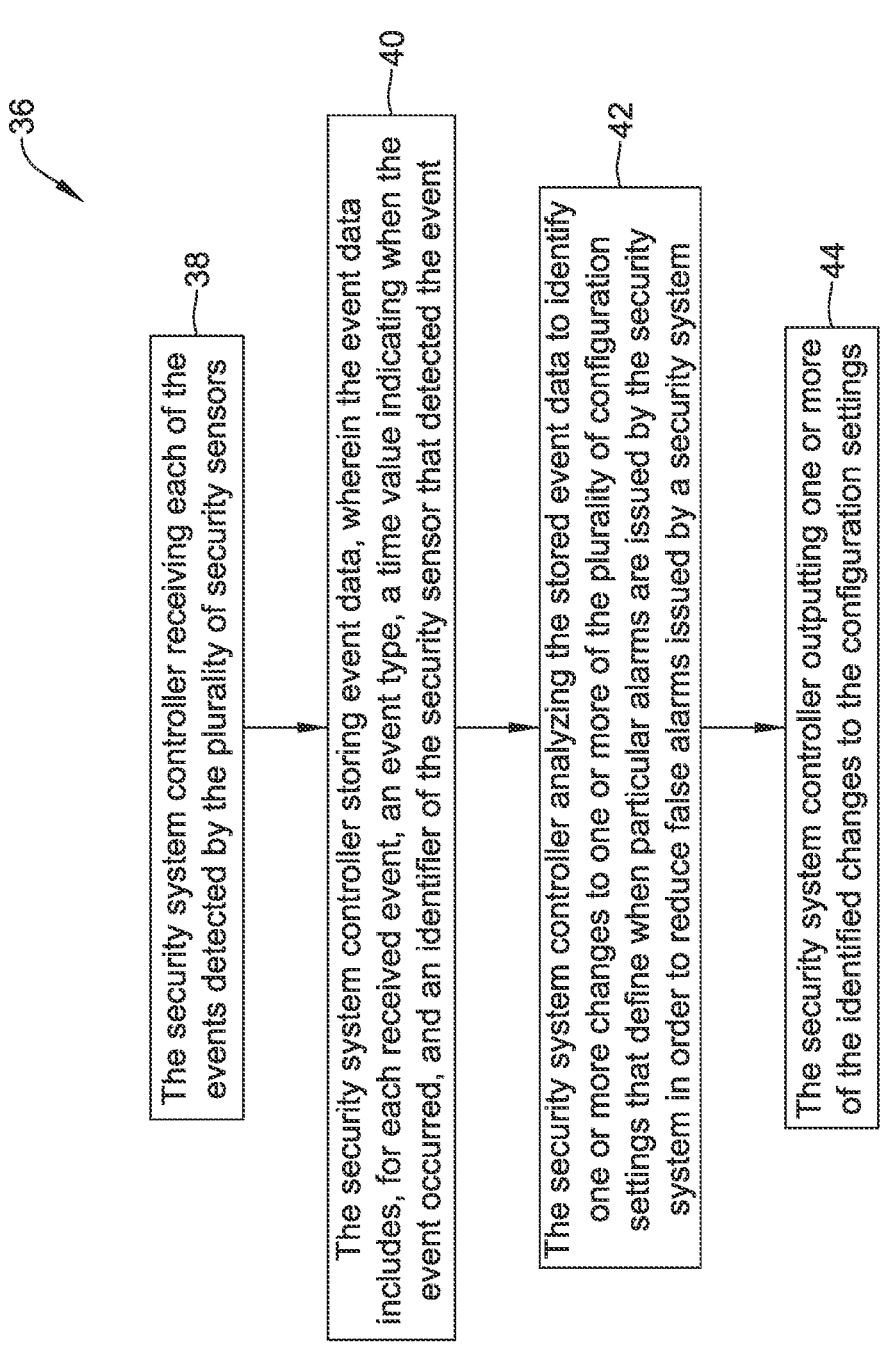
FIG. 3 is a flow diagram showing an illustrative method.
Figure 4:
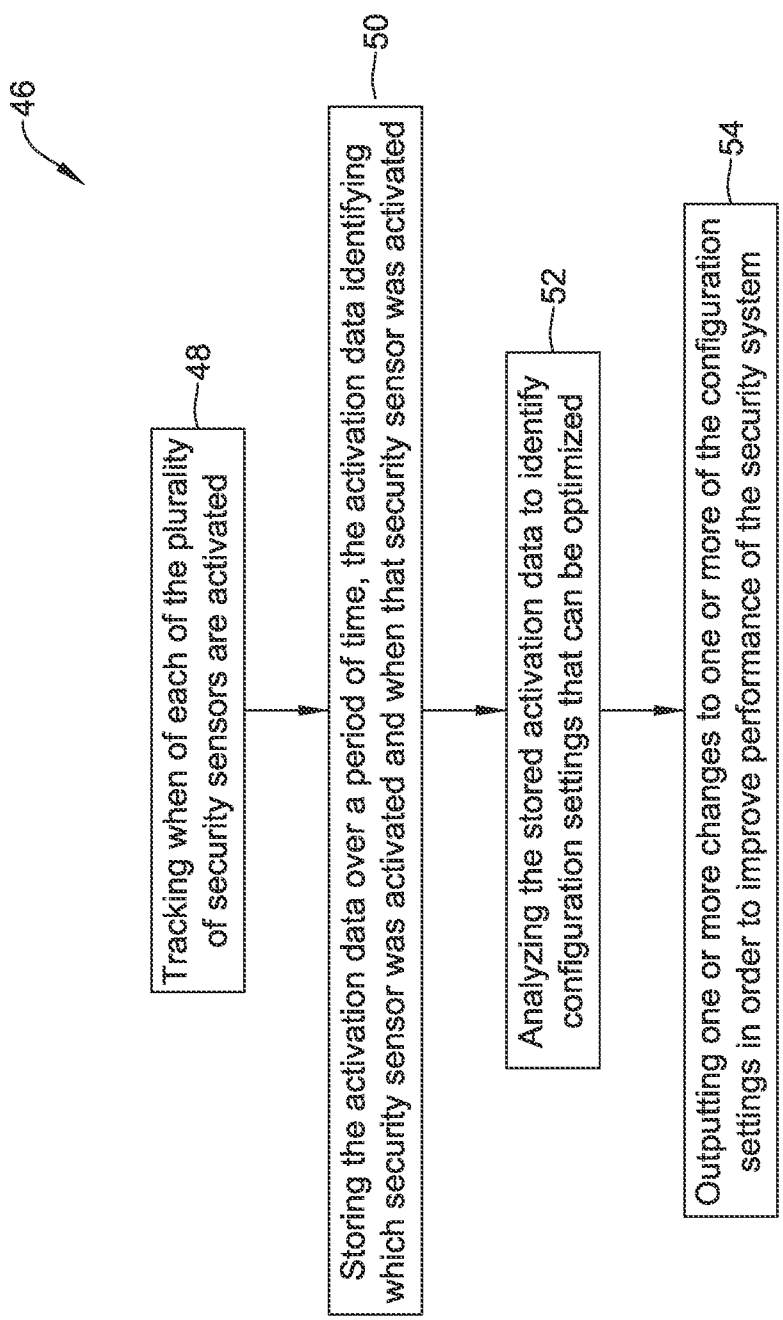
FIG. 4 is a flow diagram showing an illustrative method.

FIGS. 3 and 4 are flow diagrams showing illustrative methods that may be orchestrated by the cloud-based server 24, the security system controller 14 and/or the edge device 22 and thus carried out by the security system 10. FIG. 3 is a flow diagram showing an illustrative method 36 of reducing false alarms issued by a security system (such as the security system 10), the security system having a security system controller (such as the security system controller 14) and a plurality of security sensors (such as the security sensors 12) operably coupled with the security system controller. Each of the plurality of security sensors is configured to monitor for and detect one or more predetermined events in a secure space. The security system includes a plurality of configuration settings that define when particular alarms are to be issued by the security system based at least in part on the events that are detected by the plurality of security sensors. The method 36 includes the security system controller receiving each of the events detected by the plurality of security sensors, as indicated at block 38. The security system controller stores event data, wherein the event data includes, for example, an event type, a time value indicating when the event occurred, and an identifier of the security sensor that detected the event for each received event, as indicated at block 40.

The security system controller analyzes the stored event data to identify one or more changes to one or more of the plurality of configuration settings that define when particular alarms are to be issued by the security system in order to reduce false alarms issued by the security system, as indicated at block 42. In some cases, the security system controller analyzes the stored event data to identify one or more patterns in the stored event data to identify the changes to one or more of the plurality of configuration settings that define when particular alarms are to be issued by the security system in order to reduce false alarms issued by a security system. In some cases, the security system controller may utilize machine learning in analyzing the stored event data.

The illustrative security system includes an armed state and a disarmed state. In some instances, the security system controller stores event data collected when the security system is in the disarmed state, and the security system controller analyzes the stored event data corresponding to the disarmed state when identifying one or more changes to the configuration settings that define when particular alarms are to be issued by the security system in order to reduce false alarms issued by a security system. The security system controller outputs one or more of the identified changes to the configuration settings, as indicated at block 44. In some cases, the security system controller automatically implements one or more of the identified changes. In some cases, a user may selectively implement one or more of the identified changes.

In some cases, one of the plurality of configuration settings defines a first security sensor of the plurality of security sensors and a second security sensor of the plurality of security sensors as a cross zone set of sensors (e.g. a cross zone pair of sensors), wherein the first security sensor and the second security sensor each must detect a corresponding event within a cross-zone time period associated with the cross zone set of sensors before the security system will issue a corresponding alarm. In some instances, the first security sensor of the plurality of security sensors is a first sensor type for detecting a first event type and the second security sensor of the plurality of security sensors is a second sensor type for detecting a second event type, wherein the first event type is the same (or different) from the second event type.

In one example, one of the identified changes to the configuration settings that are outputted by the security system controller may include changing the second security sensor of the cross zone set of sensors mentioned above to a third security sensor of the plurality of security sensors. In another example, one of the identified changes to the configuration settings that are outputted by the security system controller may include adding a third security sensor of the plurality of security sensors to the cross zone set of sensors, where all three security sensors must detect an associated change or event within the cross-zone time period that is associated with the cross zone set of sensors before the security system will issue a corresponding alarm. In another example, one of the identified changes to the configuration settings that are outputted by the security system controller may include changing the cross-zone time period that is associated with the cross zone set of sensors. In another example, one of the identified changes to the configuration settings that are outputted by the security system controller may include adding an additional cross zone set of two or more of the plurality of security sensors.

In some cases, one of the plurality of configuration settings may include an abort window with an abort time limit. When so provided, one of the one or more identified changes to the configuration settings may include a change to the abort time limit. In some cases, one of the plurality of configuration settings may include an entry and/or an exit delay. When so provided, one of the one or more identified changes to the configuration settings may include a change to the entry and/or exit delay.

FIG. 4 is a flow diagram showing an illustrative method 46 of improving performance of a security system (such as the security system 10) having a plurality of security sensors (such as the security sensors 12) and a plurality of configuration settings covering at least some of the plurality of security sensors. The illustrative method 46 includes tracking when of each of the plurality of security sensors are activated, as indicated at block 48. The activation data is stored over a period of time, the activation data identifying which security sensor was activated and when that security sensor was activated, as indicated at block 50. The stored activation data is analyzed to identify configuration settings that can be optimized, as indicated at block 52. One or more changes to one or more of the configuration settings are outputted in order to improve performance of the security system, as indicated at block 54.

Figure 5:
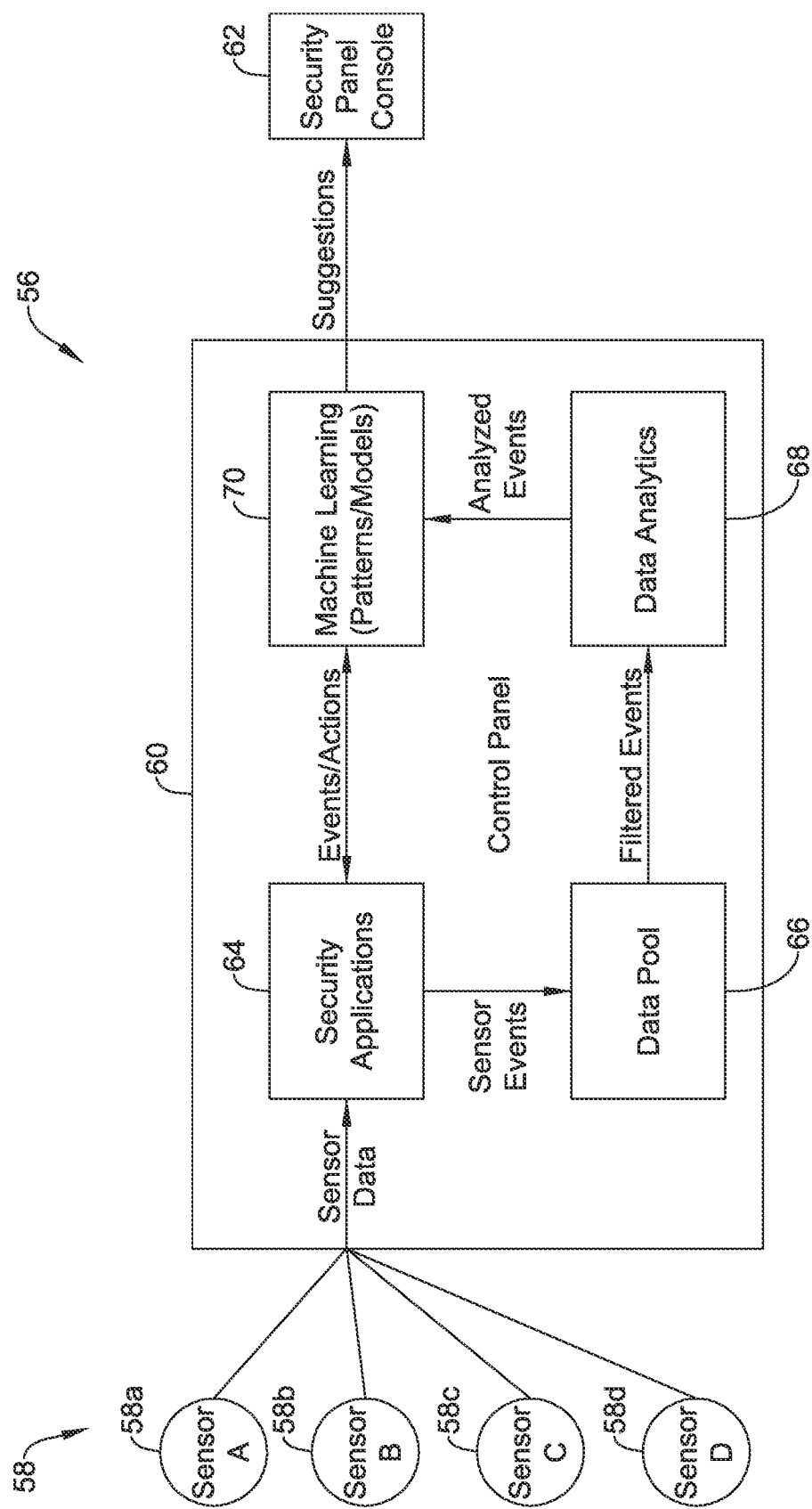
FIG. 5 is a schematic block diagram showing an illustrative security system.

FIG. 5 is a schematic block diagram of a security system 56. The illustrative security system 56 may be considered as being an example of the security system 10. The security system 56 includes a number of sensors 58, individually labeled as 58a, 58b, 58c, 58d. While a total of four sensors 58 are shown, it will be appreciated that the security system 56 may include less or a considerably greater number of sensors 58. At least some of the sensors 58 may include motion sensors such as but not limited to PIR sensors. Alternatively, or in addition, at least some of the sensors 58 may include door contact sensors and/or window contact sensors. Alternatively, or in addition, at least some of the sensors 58 may include glass break detectors. Alternatively, or in addition, at least some of the sensors 58 may include one or more video cameras, optionally with video processing capabilities. These are just examples.

In the example shown, the sensors 58 provide signals to a control panel 60. The control panel 60 provides suggestions as outputs to a security panel console 62. In some cases, the security panel console 62 may be considered as being part of the security system controller 14, which may for example display suggested improvements on the display 16. As can be seen, the control panel 60 may be considered as including a number of individual logic blocks. These logic blocks may each represent software having a particular function, for example, although the logic blocks may also be manifested in hardware, i.e., separate circuits. In some cases, the control panel 60 may be considered as including the functionality that may be present in one or more of the security system controller 14, the edge device 22 and the cloud-based server 24 of FIG. 1.

Sensor data from the sensors 58 passes to a security applications block 64. Sensor events that are detected by the security applications block 64 are passed to a Data Pool 66. Filtered events that are found within the Data Pool 66 are provided to a Data Analytics block 68. Analyzed events from the Data Analytics block 68 are passed to a Machine Learning block 70. It will be appreciated that events and corresponding actions may pass back and forth between the Security Applications block 64 and the Machine Learning block 70. The Machine Learning block 70 outputs suggestions to the Security Panel Console 62.

Figure 6:
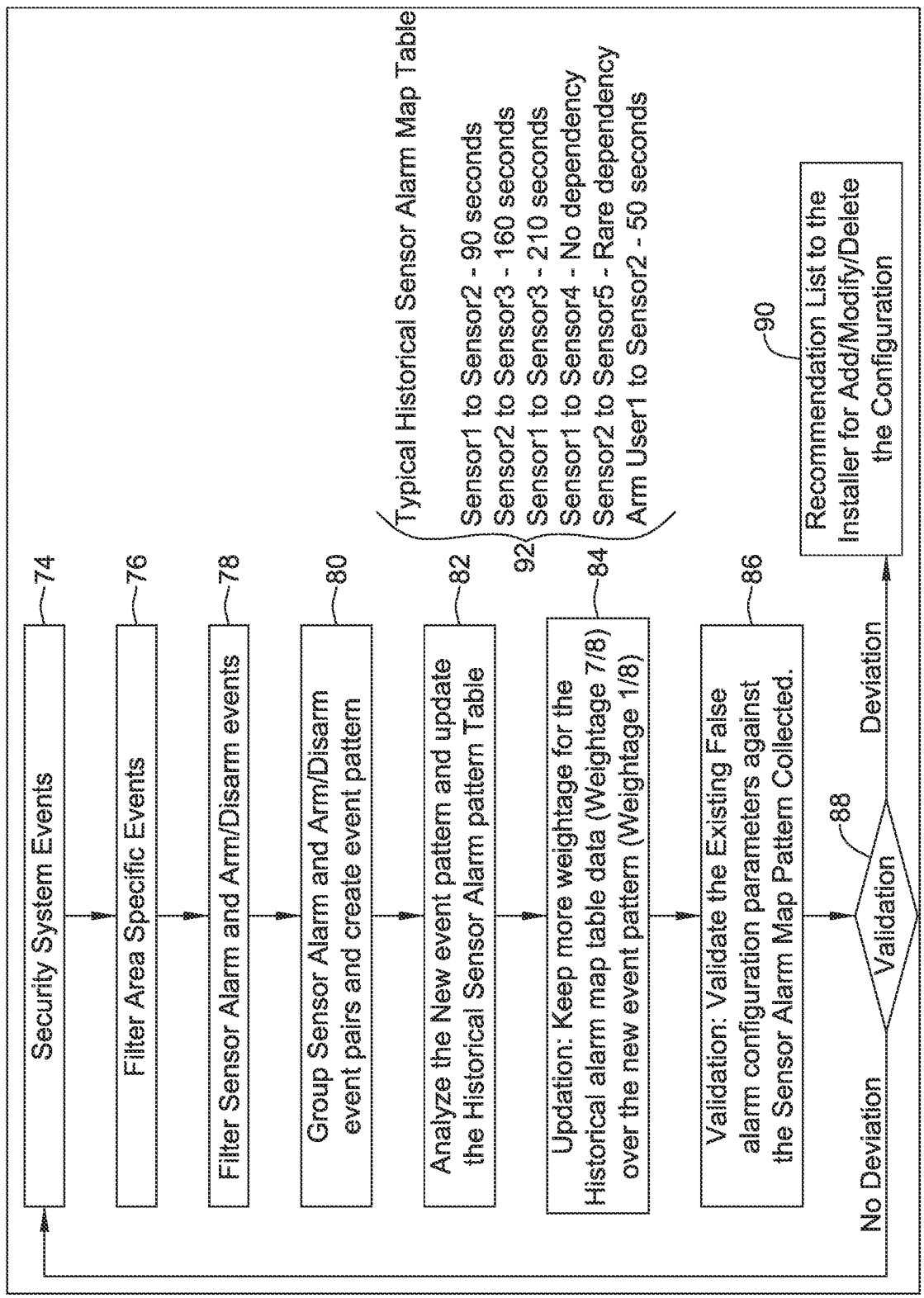
FIG. 6 is a flow diagram showing an illustrative method.

FIG. 6 is a flow diagram showing an illustrative method 72 that may be carried out in improving the performance of a security system such as the security system 10 or the security system 56. Security system events are reported, as indicated at block 74. In some cases, the security system events are identified via the security applications block 64 of FIG. 5 and reported to Data Pool 66. Specific events may be filtered, as indicated at block 76. Filtering may be used to limit the reported events to, for example, a particular location, a particular time frame, from particular sensor types and/or particular event types (motion, glass break, etc.). These are just example filter criteria. In some cases, filtered sensor alarm data and/or Arm/Disarm events are identified, as indicated at block 78, and selectively paired together, as indicated at block 80, in order to create a new event pattern. In some cases, the new event patterns may be identified by the Data Analytics block 68 of FIG. 5. The new event patterns are analyzed and a Historical Sensor Alarm pattern table 92 is updated, as indicated at block 82. As indicated at block 84, in some cases, updating the Historical Sensor Alarm pattern table 92 is weighted, with existing data weighted more heavily than new event patterns. For example, historical data may have a ⅞ (0.875) weighting while new data may have a ⅛ (0.125) weighting. This is just an example, and other relative weighting values may be applied as appropriate.

The Historical Sensor Alarm pattern table 92 may identify various patterns between sensor activations over time. For example, the Historical Sensor Alarm pattern table 92 of FIG. 6 has identified a number of patterns including a heavy dependency between a first sensor (Sensor1) activation to a second sensor (Sensor2) activation with a time difference of about 90 seconds, a heavy dependency between the second sensor (Sensor2) activation to a third sensor (Sensor3) activation with a time difference of about 160 seconds, a heavy dependency between the first sensor (Sensor1) activation to the third sensor (Sensor3) activation with a time difference of about 210 seconds, no dependency between activation the first sensor (Sensor1) and a fourth sensor (Sensor4), a rare dependency between activation the second sensor (Sensor2) and a fifth sensor (Sensor5), and a system arm specific to a user1 to the second sensor (Sensor2) activation having a time difference of about 50 seconds. These patterns have been identified from the sensor data and recorded in the Historical Sensor Alarm pattern table 92. These patterns may be processed by the Machine Learning block 70 of FIG. 5 to identify suggested changes to the configuration settings of the security system to help reduce false alarms of the security system.

In some cases, the existing configuration parameters are validated against the sensor alarm patterns of the Historical Sensor Alarm pattern table 92, as indicated at block 86. At a decision block 88, a determination is made as to whether there is sufficient deviation to justify a configuration setting change. If not, control reverts to block 74. However, if there a determination made at decision block 88 that there is sufficient deviation to justify a configuration setting change, control passes to block 90, where a recommendation list is provided to the installer or other user in order to add configuration settings, delete configuration settings and/or to modify existing configuration settings.

These suggested changes may be on-going any may adapt to changes in the security system and/or the activity in the secured region. For example, if a sensor were to fail (such as Sensor1), the system may use the sensor data to identify and suggest configuration settings changes to include another cross-zone pair of sensors using two or more of the remaining sensors and a different cross-zone time period to accommodate the Sensor1 failure. In another example, if a sensor were to be added to the security system, the system may use the sensor data to identify and suggest configuration settings changes to include a cross-zone pair of sensors using the newly added sensor. In another example, if a new user (e.g. user2) is hired, and the new user takes longer to arm the security system and exit the secured area, the system may use the sensor data to identify and suggest configuration settings changes to increase the exit delay for user2. In another example, if the activity were to change in the secured region because of different traffic flow patterns or for some other reason, the system may use the sensor data to identify and suggest configuration settings changes to accommodate the changes in the activity. These are just examples.

Figure 7:
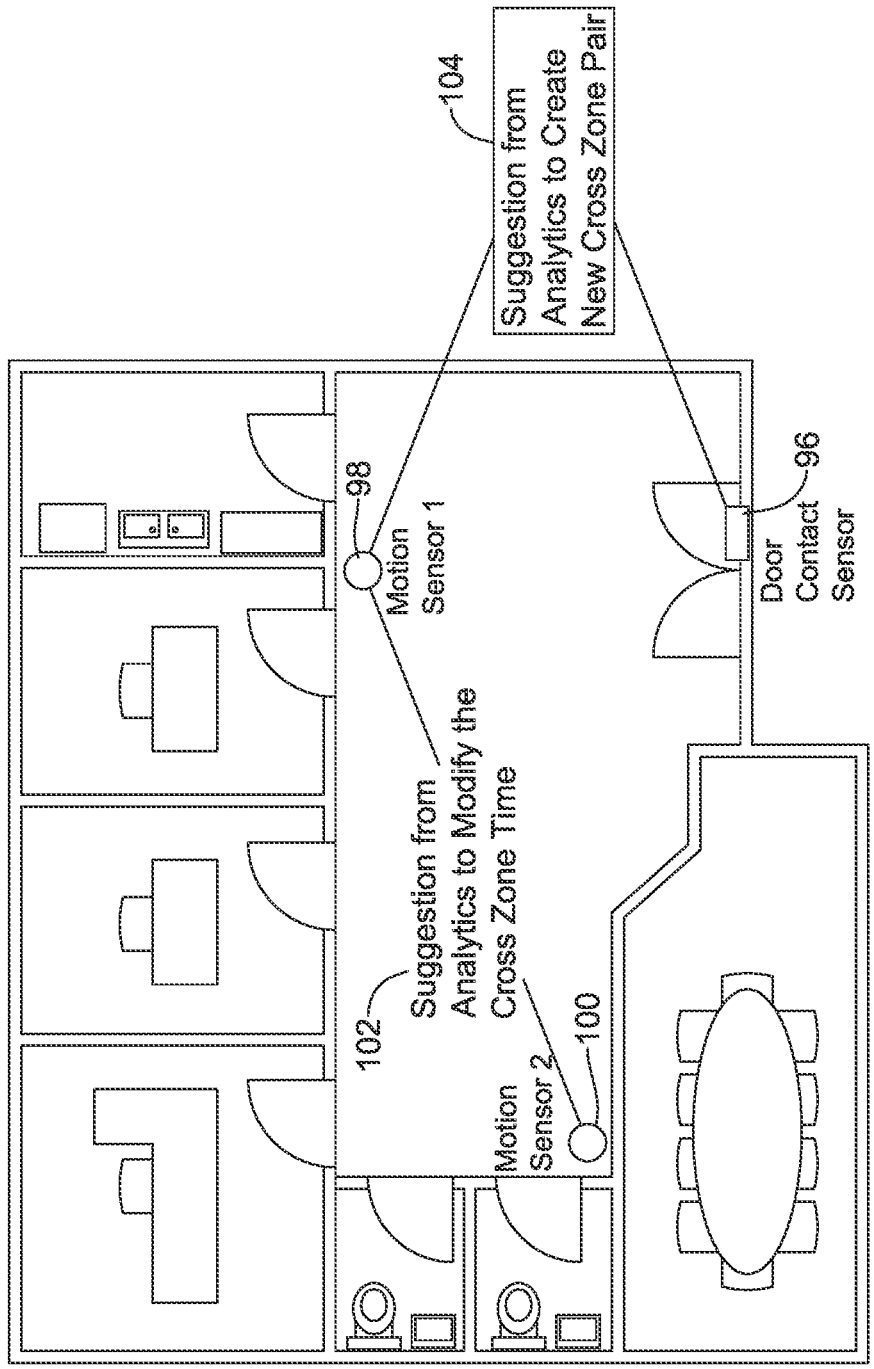
FIG. 7 is a schematic view of a secured area.

FIG. 7 is a schematic view of a secured area 94 that includes a typical office space including several offices, a conference room, several bathrooms, a kitchen and a common area. The common area includes a door contact sensor 96 disposed adjacent a door to the common area, a first motion sensor 98 near a door to the kitchen and a second motion sensor 100 in a corner of the common area near one of the bathrooms. As an example, say there is currently a cross zone pair formed between the first motion sensor 98 and the second motion sensor 100. One possible suggestion from the analytics to improve the performance of the security system may include modifying the cross zone time, as indicated at 102.

Perhaps the analyzed historical data indicates that it would be more efficient to require one of the first motion sensor 98 and the second motion sensor 100 to detect motion within twenty seconds of the other of the first motion sensor 98 and the second motion sensor 100 in order to confirm a detection, instead of the current thirty seconds time limit. This change may be suggested if for example the analyzed data indicates that people walking in various directions through the common area typically trigger both the first motion sensor 98 and the second motion sensor 100 within ten or fifteen seconds of each other. Conversely, the suggested cross zone time could be increased if it has been taking people longer than thirty seconds to transverse the common area sufficiently to trigger both the first motion sensor 98 and the second motion sensor 100.

Another possible suggestion, as indicated at 104, would be to form a new cross zone pair between the first motion sensor 98 and the door contact sensor 96. This suggestion may occur if analysis of the historical data indicates a strong correlation between when someone entering the common area triggers the door contact sensor 96 and when they trigger the first motion sensor 98. These are just examples, as it will be appreciated that a particular space may include a variety of different sensors and sensor types, with traffic patterns that are unique to that space.

Figure 8:
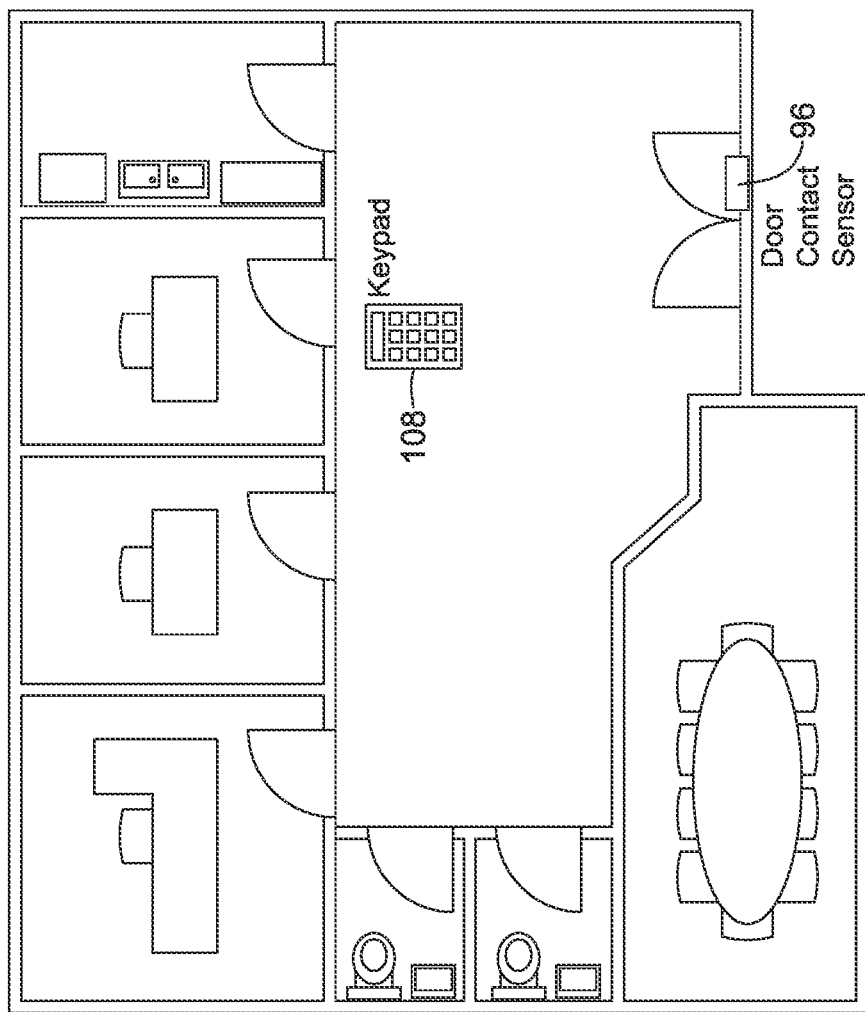
FIG. 8 is a schematic view of a secured area.

FIG. 8 is a schematic view of a secured area 106 that shows a typical office space including several offices, a conference room, several bathrooms, a kitchen and a common area. The common area includes a door contact sensor 96 disposed adjacent a door to the common area. The common area also includes a keypad 108 that may be used to arm and disarm a security system, for example. The security system may include an entry delay or an exit delay, for example. The entry delay indicates how long a person has to reach the keypad 108 and disarm the security system once they trigger the door contact sensor 96. Say this time was set to be equal to thirty seconds. If the person entering the common area does not disarm the system within thirty seconds, an alarm is raised.

If analysis of historical data indicates that people are averaging ten or twelve seconds to cross the common area and enter an appropriate code into the keypad 108 to disarm the system, a suggestion may be made to decrease the entry delay to only twenty seconds in order to improve security. Conversely, if the analysis indicates that people are having trouble entering the code within thirty seconds, a suggestion may be made to increase the entry delay to forty-five seconds in order to reduce the number of possible false alarms. A similar analysis may be performed with respect to an exit delay, which is how long the person arming the system via the keypad 108 has to exit the common area via the door operably coupled with the door contact sensor 96.

It will be appreciated that these are simple examples, and that security systems may include a substantially greater number of sensors. This provides the possibility of a much greater number of possible cross zone sensor pairs, for example. In some cases, cross zone sensor "pairs" may include two, three or more distinct sensors, which can be of a variety of different sensor types. Over time, the patterns identified in the sensor data may change, and the configuration settings may evolve along with the changing patterns in the sensor data. Machine learning may be used to identify configuration setting changes over time by, for example, attempting to minimize false alarms issued by the security system while still detecting real alarm events. In some cases, the security system may identify possible false alarms to an operator, and the operator may confirm whether the possible false alarms are in fact false alarms. This confirmation may be used to teach the machine learning algorithm to more accurately identify false alarms in the security system and more accurately identify appropriate configuration setting changes over time.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of operating a security system, the security system having a security system controller and a plurality of security sensors operably coupled with the security system controller, wherein each of the plurality of security sensors is configured to monitor for and detect one or more predetermined events in a secure space, the security system including a plurality of configuration settings that define when particular alarms are to be issued by the security system based at least in part on the events that are detected by the plurality of security sensors, the method comprising:

the security system controller storing event data associated with events detected by the plurality of security sensors;

the security system controller analyzing the stored event data to identify one or more changes to one or more of the plurality of configuration settings that define when particular alarms are issued by the security system, wherein the identified changes to one or more of the plurality of configuration settings include one or more of:

defining a new cross zone set of the plurality of security sensors, where each sensor of the new cross zone set of the plurality of security sensors must detect an event within a cross-zone time period of each other before the security system will issue a corresponding alarm;

removing an existing cross zone set of the plurality of security sensors;

changing an existing cross zone set to include a different combination of the plurality of security sensors;

changing a cross-zone time period associated with an existing cross zone pair of the plurality of security sensors;

changing an entry delay time, where the entry delay time represents a time period after a user enters into the secure space that the user must present a validation otherwise the security system will issue a corresponding alarm;

changing an exit delay time, where the exit delay time represents a time period after the user arms the security system that the user must exit the secure space otherwise the security system will issue a corresponding alarm; and the security system controller outputting one or more of the identified changes to the one or more of the plurality of configuration settings.

2. The method of claim 1, wherein the identified one or more changes to the one or more of the plurality of configuration settings includes defining the new cross zone set of the plurality of security sensors.

3. The method of claim 1, wherein the identified one or more changes to the one or more of the plurality of configuration settings includes removing an existing cross zone set of the plurality of security sensors.

4. The method of claim 1, wherein the identified one or more changes to the one or more of the plurality of configuration settings includes changing an existing cross zone set to include a different combination of the plurality of security sensors.

5. The method of claim 1, wherein the identified one or more changes to the one or more of the plurality of configuration settings includes changing a cross-zone time period associated with an existing cross zone pair of the plurality of security sensors.

6. The method of claim 1, wherein the identified one or more changes to the one or more of the plurality of configuration settings includes changing the entry delay time.

7. The method of claim 1, wherein the identified one or more changes to the one or more of the plurality of configuration settings includes changing the exit delay time.

8. The method of claim 1, wherein the security system controller analyzes the stored event data to identify one or more patterns in the stored event data, wherein the one or more patterns are used to identify one or more of the changes to the one or more of the plurality of configuration settings.

9. The method of claim 8, wherein the security system controller uses a machine learning model to identify one or more of the changes to one or more of the plurality of configuration settings based at least in part on the identified one or more patterns.

10. The method of claim 1, wherein the security system controller uses a machine learning model that is trained to identify one or more of the changes to one or more of the plurality of configuration settings that reduce false alarms issued by the security system while still detecting real alarm events.

11. The method of claim 10, wherein the machine learning model is configured to identify possible false alarms to an operator, wherein the operator confirms to the machine learning model whether the possible false alarms are in fact false alarms, and the machine learning model is configured to use the confirmation to teach the machine learning model to more accurately identify false alarms and more accurately identify appropriate configuration setting changes over time.

12. The method of claim 1, wherein the security system includes an armed state and a disarmed state, and wherein the security system controller stores event data collected when the security system is in the disarmed state, and the security system controller analyzes the stored event data corresponding to the disarmed state when identifying one or more changes to the one or more of the plurality of configuration settings that define when particular alarms are issued by the security system.

13. The method of claim 1, wherein the security system controller automatically implements one or more of the identified changes.

14. A method of operating a security system, the security system having a security system controller and a plurality of security sensors operably coupled with the security system controller, wherein each of the plurality of security sensors is configured to monitor for and detect one or more predetermined events in a secure space, the security system including a plurality of configuration settings that define when particular alarms are to be issued by the security system based at least in part on the events that are detected by the plurality of security sensors, the method comprising:

the security system controller storing event data associated with events detected by the plurality of security sensors;

the security system controller using a machine learning model to analyze the stored event data to identify one or more changes to one or more of the plurality of configuration settings that define when particular alarms are issued by the security system, wherein the machine learning model is trained to identify one or more changes to one or more of the plurality of configuration settings that reduce false alarms issued by the security system while still detecting real alarm events; and the security system controller outputting one or more of the identified changes to the one or more of the plurality of configuration settings.

15. The method of claim 14, wherein the security system controller is distributed.

16. The method of claim 14, wherein the machine learning model is configured to identify possible false alarms to an operator, wherein the operator confirms to the machine learning model whether the possible false alarms are in fact false alarms, and the machine learning model uses this confirmation to teach the machine learning model to more accurately identify false alarms and more accurately identify appropriate configuration setting changes over time.

17. The method of claim 14, wherein the security system includes an armed state and a disarmed state, and wherein the security system controller stores event data collected when the security system is in the disarmed state, and the security system controller uses the stored event data corresponding to the disarmed state when identifying one or more changes to the one or more of the plurality of configuration settings that define when particular alarms are issued by the security system.

18. A method of operating a security system that has an armed state and a disarmed state, the security system includes a plurality of security sensors each for detecting events in a secure area, and one or more configuration settings that define at least in part when one or more alarms are issued by the security system based at least in part on one or more of the detected events, the method comprising:

storing event data associated with events detected by the plurality of security sensors while the security system in the disarmed state;

analyzing the stored event data;

based at least in part on the analysis of the stored event data, identifying one or more changes to one or more of the configuration settings to improve a performance of the security system; and implementing one or more of the changes to the one or more of the configuration settings of the security system.

19. The method of claim 18, wherein a machine learning model is used to identify one or more changes to one or more of the configuration settings to improve the performance of the security system, wherein the machine learning model is trained to identify one or more of the changes to one or more of the configuration settings that reduce false alarms issued by the security system while still detecting real alarm events.

20. The method of claim 19, wherein the machine learning model is configured to identify possible false alarms to an operator, wherein the operator confirms to the machine learning model whether the possible false alarms are in fact false alarms, and the machine learning model is configured to use the confirmation to teach the machine learning model to more accurately identify false alarms and more accurately identify appropriate configuration setting changes over time.

* * * * *